(12) United States Patent
Mohammad (10) Patent No.: US 8,144,349 B2
(45) Date of Patent: Mar. 27, 2012

(54) DISTRIBUTING PRINTED DOCUMENTS

(75) Inventor: Soiba Mohammad, Winnetka, CA (US)

(73) Assignee: Eicoh Company, Ltd., Tokyo (JP)

( * ) Notice: Subject to any disclaimer, the term of this patent is extended or adjusted under 35 U.S.C. 154(b) by 1280 days.

(21) Appl. No.: 11/652,930

(22) Filed: Jan. 11, 2007

(65) Prior Publication Data

US 2008/0170253 A1    Jul. 17, 2008

(51) Int. Cl.
  *G06F 3/12*   (2006.01)
  *G06F 15/16*  (2006.01)
  *G06K 15/00*  (2006.01)

(52) U.S. Cl. ....... 358/1.15; 358/1.16; 709/203; 709/219

(58) Field of Classification Search ............ 358/1.15, 358/1.13, 1.16, 1.1, 402, 444, 468, 1.14; 725/203, 214, 216, 215, 218, 219; 715/717, 715/744, 968; 709/203, 214, 216, 215, 218, 709/219

See application file for complete search history.

(56) References Cited

U.S. PATENT DOCUMENTS

| | | | |
|---|---|---|---|
| 6,791,702 B2* | 9/2004 | Tanaka | 358/1.13 |
| 6,993,562 B2* | 1/2006 | Treptow et al. | 709/206 |
| 7,312,887 B2* | 12/2007 | Wu | 358/1.15 |
| 7,692,807 B1* | 4/2010 | Sanders et al. | 358/1.15 |
| 7,982,900 B2* | 7/2011 | Miura et al. | 358/1.16 |
| 2003/0065531 A1* | 4/2003 | Satomi et al. | 705/1 |
| 2003/0067621 A1* | 4/2003 | Tanaka | 358/1.13 |
| 2003/0154395 A1* | 8/2003 | Miura et al. | 713/200 |
| 2003/0182367 A1* | 9/2003 | Ohara | 709/203 |
| 2003/0234948 A1* | 12/2003 | Sasaki | 358/1.13 |
| 2004/0130746 A1* | 7/2004 | Wu | 358/1.15 |
| 2004/0143651 A1* | 7/2004 | Allen et al. | 709/221 |
| 2004/0184072 A1* | 9/2004 | Jacobsen et al. | 358/1.15 |
| 2005/0024677 A1* | 2/2005 | Miura et al. | 358/1.15 |
| 2005/0138065 A1* | 6/2005 | Ciriza | 707/104.1 |
| 2005/0236473 A1* | 10/2005 | Lenz et al. | 235/380 |

(Continued)

FOREIGN PATENT DOCUMENTS

JP    11143802 A    5/1998

(Continued)

OTHER PUBLICATIONS

S. Chan et al., "Devices Profile for Web Services," Microsoft Corporation, May 2005, 39 pages.

R. Williams et al., "Web Services for Devices: The .NET Vision Realized," Microsoft Corporation, 2005, 9 pages.

Anonymous, "Print Service Definition Version 1.0 for Web Services on Devices," Microsoft Corporation, Nov. 9, 2006, 101 pages.

*Primary Examiner* — Madelein A Nguyen (74) *Attorney, Agent, or Firm* — Hickman Palermo Truong & Becker LLP (57) ABSTRACT

A system for distributing printed documents comprises print device logic comprising a Web Services server, wherein the print device logic is configured to send one or more Web Services messages that indicate attributes of a print device; sender print manager logic comprising a first Web Services client that is coupled over a network to the printer logic; wherein the sender print manager logic is configured to store the attributes, to request print history information from the print device, to determine one or more preferred print devices for one or more users based on the print history information, and to store a mapping of identifiers of the users in association with identifiers of the preferred print devices; wherein the sender print manager logic is configured to select one or more of the preferred print devices based on the mapping, and to initiate one or more print jobs to print a document on the selected preferred print devices.

10 Claims, 7 Drawing Sheets

U.S. PATENT DOCUMENTS

| | | | |
|---|---|---|---|
| 2006/0095498 A1* | 5/2006 | Yamauchi | 709/201 |
| 2006/0271936 A1* | 11/2006 | Matsuda et al. | 718/102 |
| 2006/0294251 A1* | 12/2006 | Cocotis et al. | 709/229 |
| 2007/0070401 A1* | 3/2007 | Okamoto et al. | 358/1.15 |
| 2007/0150421 A1* | 6/2007 | Chatte | 705/403 |
| 2007/0206215 A1* | 9/2007 | Iwase | 358/1.15 |
| 2007/0229873 A1* | 10/2007 | Kato | 358/1.14 |
| 2008/0037062 A1* | 2/2008 | Omino et al. | 358/1.15 |
| 2009/0106836 A1* | 4/2009 | Toshima et al. | 726/22 |
| 2009/0244620 A1* | 10/2009 | Takahashi et al. | 358/1.15 |
| 2010/0271663 A1* | 10/2010 | Kadota | 358/1.15 |

FOREIGN PATENT DOCUMENTS

| | | |
|---|---|---|
| JP | 2003085085 A | 3/2003 |
| JP | 2003150348 A | 5/2003 |
| JP | 2005278144 A | 10/2005 |
| JP | 2005352784 A | 12/2005 |

* cited by examiner

Operation of Print Manager at End User Computer (claim 11)

302 RECEIVE REQUEST TO PROVIDE PRINTED DOCUMENT TO ONE OR MORE COMPUTER USERS

304 ACCESS STORED TABLE OF INFORMATION ABOUT PRINT DEVICES

306 GENERATE AND SEND ONE OR MORE WEB SERVICES REQUESTS TO PRINT DEVICES TO OBTAIN PRINT HISTORY DATA

308 DETERMINE, FROM PRINT HISTORY DATA, A PRIMARY PRINT DEVICE FOR EACH OF THE USERS

310 GENERATE AND SEND, TO EACH PRIMARY PRINT DEVICE OF A USER, A REQUEST TO PRINT THE DOCUMENT

Fig. 4A

Operation of Sender Print Manager Logic (Claim 1)

402 RECEIVE WEB SERVICES MESSAGE(S) THAT INDICATE ATTRIBUTE(S) OF PRINT DEVICE(S) AND STORE ATTRIBUTE(S)

404 REQUEST PRINT HISTORY INFORMATION FROM PRINT DEVICE(S)

406 DETERMINE PREFERRED PRINT DEVICE(S) FOR USER(S) BASED ON PRINT HISTORY INFORMATION

408 STORE MAPPING OF IDENTIFIER(S) OF USER(S) IN ASSOCIATION WITH IDENTIFIER(S) OF PREFERRED PRINT DEVICE(S)

410 SELECT ONE OR MORE PREFERRED PRINT DEVICE(S) BASED ON MAPPING

412 INITIATE PRINT JOB(S) TO PRINT DOCUMENT ON SELECTED PREFERRED PRINT DEVICE(S)

FIG. 5

US 8,144,349 B2

DISTRIBUTING PRINTED DOCUMENTS

FIELD OF THE INVENTION

The present disclosure generally relates to managing printers that print electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In work environments with networked computers, printers are often geographically distributed in the environment. Further, computer users typically use many different software applications, and one user of one computer in the network cannot easily determine what applications are in use by another user of a second computer in the network.

In this environment, a first user may encounter difficulty distributing a particular electronic file or document to one or more other users. As a hypothetical example, assume that one user, Alice, desires to distribute an electronic slide presentation to Bob and Carol. Alice has prepared the presentation using a hypothetical client-based presentation software program called SuperSlide. Alice invites Bob and Carol to a meeting and wants Bob and Carol to view the presentation before the meeting or have a printed copy of the presentation available at the meeting. However, Alice does not know if Bob or Carol have SuperSlide on their computers, and SuperSlide is not a server-based program. If Alice sends the SuperSlide presentation to Bob and Carol as a file attachment to an e-mail message, Bob and Carol may be unable to view the presentation. Alice needs a way to provide a viewable or readable electronic document to Bob and Carol without knowing what software Bob and Carol have available.

Various portable document formats have been proposed to solve this problem, including Adobe® Portable Document Format (PDF) from Adobe Systems, Inc., San Jose, Calif. However, PDF and similar formats all require receiving users such as Bob and Carol to have a document reader installed and available on their machine.

In operating systems such as MICROSOFT WINDOWS XP, a user can install on a client computer driver software for multiple printers, including networked printers. The user can instruct the operating system that one of the printers is a "default" printer. Print requests are directed to the default printer unless the user specifies a different printer at the time of printing, using a print dialog or other facility of the operating system and its applications.

SUMMARY

Techniques for distributing printed documents are provided. In an embodiment, a system for distributing printed documents comprises print device logic comprising a Web Services server; the print device logic is configured to send one or more Web Services messages that indicate attributes of a print device; sender print manager logic comprising a first Web Services client that is coupled over a network to the printer logic; the sender print manager logic is configured to store the attributes, to request print history information from the print device, to determine one or more preferred print devices for one or more users based on the print history information, and to store a mapping of identifiers of the users in association with identifiers of the preferred print devices; the sender print manager logic is configured to select one or more of the preferred print devices based on the mapping, and to initiate one or more print jobs to print a document on the selected preferred print devices.

In one feature, the sender print manager logic is configured to request a job history from the print device, to extract at least one user identifier of a user of the print device from the job history, and to determine a preferred print device for the user based on the job history and the at least one user identifier.

In another feature, the sender print manager logic is configured to request a job history from the print device, to extract at least one print ticket from the job history, to extract at least one user identifier of a user of the print device from the job ticket, and to determine a preferred print device for the user based on the job ticket and the at least one user identifier.

In a further feature, the sender print manager logic is configured to determine the one or more preferred print devices for the one or more users based on the print history by identifying that print device to which a particular user printed most often within a specified time period.

In yet another feature, the sender print manager logic is configured to determine the one or more preferred print devices for the one or more users based on the print history by identifying that print device to which a particular user printed most often within a specified time period and based on how recently that print device was used. In still another feature, the sender print manager logic is configured as an independent service.

In a further feature, mail client logic is coupled to the sender print manager logic, and the mail client logic is configured to request, for a specified one of the users, a preferred print device based on the mapping, to initiate the one or more print jobs to print a document on the preferred print device, and to send a notification message to the specified one of the users about the one or more print jobs.

In yet another feature, mail client logic is coupled to the sender print manager logic, and the mail client logic is configured to request, for a specified one of the users, a preferred print device based on the mapping, to initiate the one or more print jobs to print a document on the preferred print device, and to send a message to the specified one of the users identifying the preferred print device.

In an embodiment, mail client logic is coupled to the sender print manager logic, and the mail client logic is configured to perform upon execution: sending a message to the specified one of the users, and the message comprises a hyperlink; receiving a selection of the hyperlink; invoking and displaying an HTML document corresponding to the hyperlink and stored on an Intranet server that is coupled to the network, and the HTML document comprises a list of print devices that are available in the network; receiving a selection of one print device from among the list; initiating a print job to print the document on the selected print device; and sending a message to the specified one of the users identifying the selected print device.

In a further feature, the system includes receiver print manager logic comprising a second Web Services client that is coupled over the network to the sender print manager logic, and the receiver print manager logic is configured to perform upon execution: storing in the mapping, an identifier of the specified one of the users in association with an identifier of the selection of the one print device; initiating one or more print jobs to print a document on the selected print device.

In an embodiment, a computer-implemented method, comprises receiving a request to provide a printed electronic document to one or more computer users; accessing a stored table of print devices in a computer network, and the print devices host a Web Services module; generating and sending, to each of the print devices, one or more Web Services requests to obtain one or more sets of print history data; determining, from the sets of print history data, a primary print device for each of the one or more computer users; generating and sending, to each primary print device associated with the one or more computer users, a request to print the electronic document.

In one feature, the determining comprises determining, from one or more print tickets within the sets of print history data, a user identifier matching the one or more computer users.

In another feature one or more Web Services responses are received from the print devices, and the determining comprises determining, from the one or more Web Services responses, one or more originating user identifiers matching the one or more computer users from within one or more job summaries in the responses.

In another embodiment, the method further comprises creating and storing a table in memory that maps each user identifier among a plurality of user identifiers to a print device among the one or more print devices that is the primary print device for the associated user identifier; determining whether the one or more computer users are identified in the table; and determining a primary print device for each of the one or more computer users when the one or more computer users are identified in the table.

In still another embodiment, receiving a request comprises receiving the request from an electronic mail client program hosted on a computer of one of the computer users.

In another embodiment, a computer-implemented method, comprises receiving an electronic mail message directed to one or more computer users and comprising an electronic document; accessing a stored table of print devices in a computer network, and the print devices host a Web Services module; generating and sending, to each of the print devices, one or more Web Services requests to obtain one or more sets of print history data; determining, from the sets of print history data, a primary print device for each of the one or more computer users; generating and sending, to each primary print device associated with the one or more computer users, a request to print the electronic document; and appending, to the electronic mail message, information specifying that the electronic document has been sent to the primary print devices.

In one feature, the appending comprises generating a copy of the electronic mail message for each of the one or more computer users; appending, to a copy for a particular one of the computer users, information specifying that the electronic document has been sent to the primary print device for that particular one of the computer users.

Another feature comprises performing the accessing, the generating and sending the Web Services requests, and the determining using a print manager module, and performing the receiving and the appending using an e-mail client program that is logically separate from the print manager module. In yet another feature the determining comprises determining, from one or more print tickets within the sets of print history data, a user identifier matching the one or more computer users.

Yet another embodiment comprises receiving one or more Web Services responses from the print devices, and the determining comprises determining, from the one or more Web Services responses, one or more originating user identifiers matching the one or more computer users from within one or more job summaries in the responses.

Still another embodiment comprises creating and storing a table in memory that maps each user identifier among a plurality of user identifiers to a name of a print device among the one or more print devices that is the primary print device for the associated user identifier; determining whether the one or more computer users are identified in the table; and determining a primary print device for each of the one or more computer users when the one or more computer users are identified in the table.

In one feature, receiving a request comprises receiving the request from an electronic mail client program hosted on a computer of one of the computer users.

Another embodiment further comprises generating and sending to the one or more computer users a request to identify a preferred print device; receiving user input from a particular computer user among the one or more computer users, and the user input identifies a preferred print device for the particular computer user; and generating and sending, to the print device identified in the user input, a request to print the electronic document.

Still another embodiment further comprises creating and storing a table in memory that maps each user identifier among a plurality of user identifiers to a name of a print device among the one or more print devices that is the primary print device for the associated user identifier; determining whether the one or more computer users are identified in the table; and determining a primary print device for each of the one or more computer users when the one or more computer users are identified in the table; storing, in the table, in association with a user identifier of the particular computer user, a name of the preferred print device identified in the user input.

In any of the foregoing embodiments, the print device may comprise a multifunction printer.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
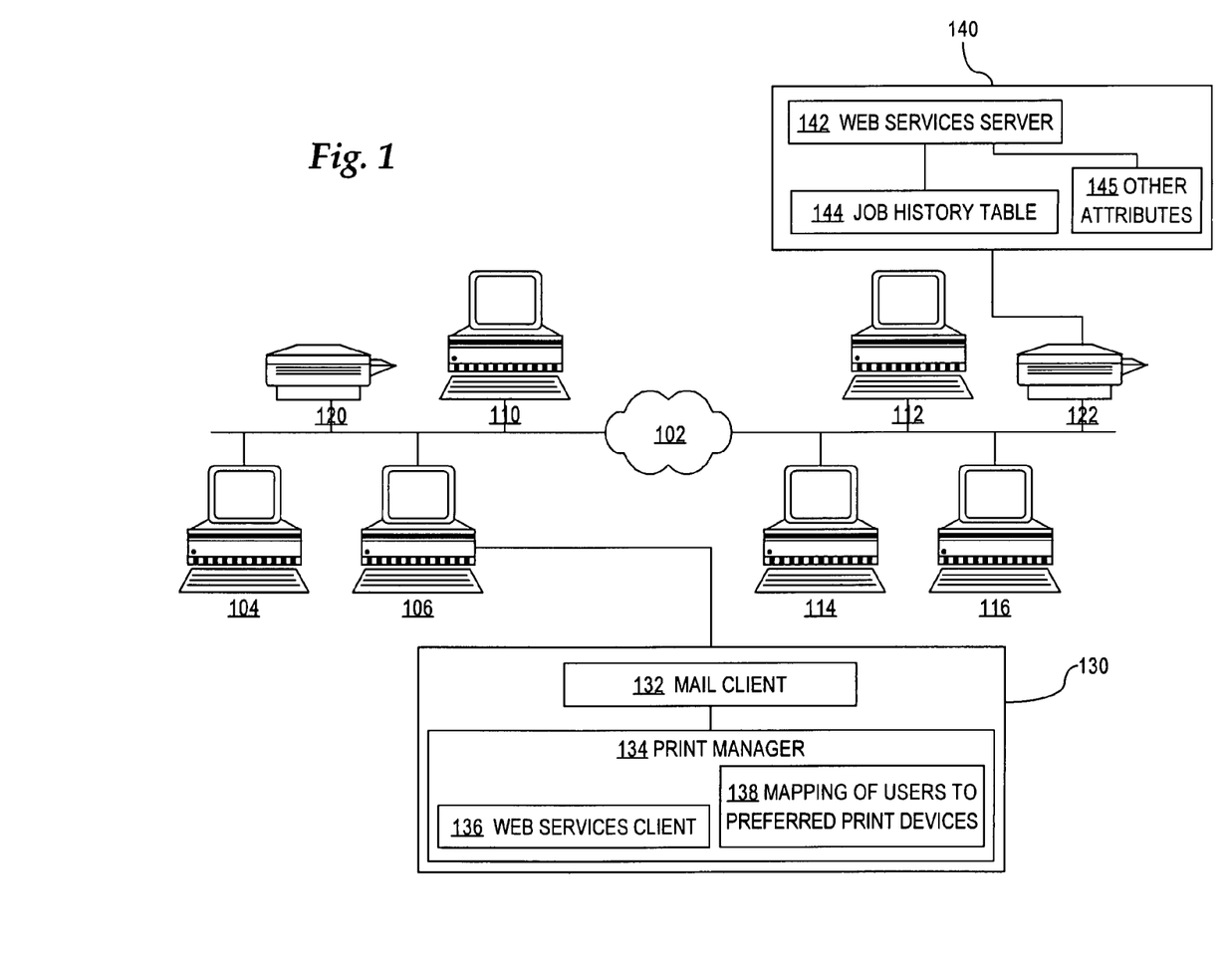
FIG. 1 illustrates a network arrangement in which an embodiment can be used.
Figure 2:
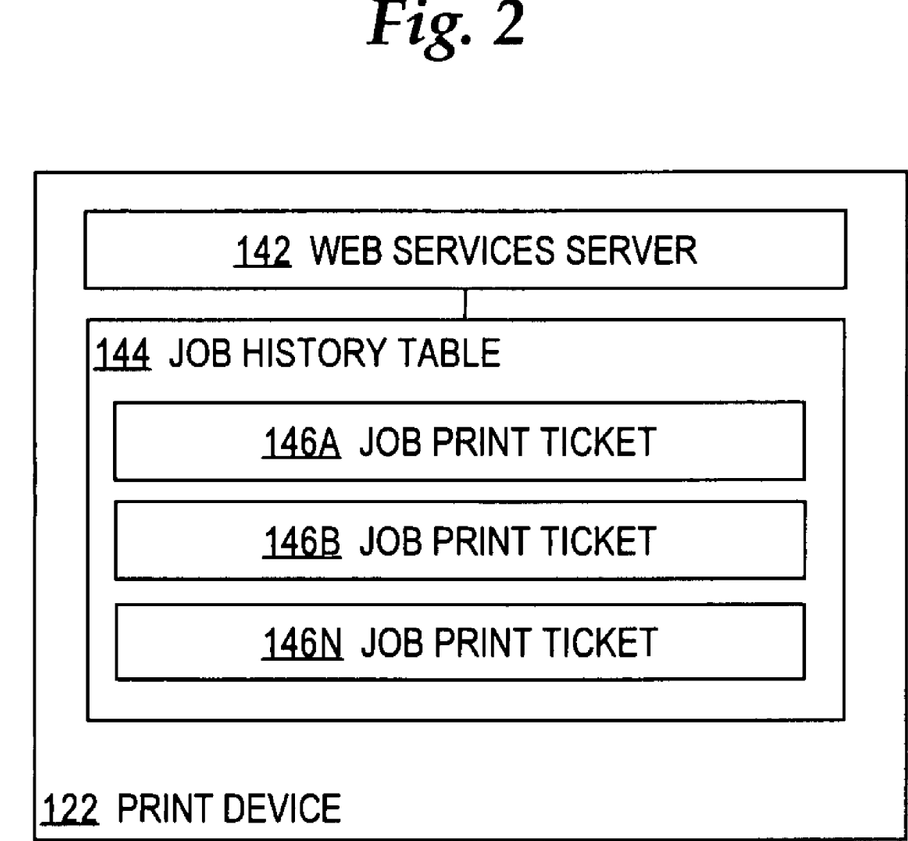
FIG. 2 illustrates data elements stored in a print device.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline:

1.0 Structural Overview
2.0 Functional Overview
2.1 Providing Printed Documents to Computer Users
2.2 Pull Mechanism for Determining Preferred Print Device
3.0 Hardware Overview
1.0 Structural Overview FIG. 1 illustrates a network arrangement in which an embodiment can be used. FIG. 2 illustrates data elements stored in a print device. Referring first to FIG. 1, in an embodiment, a plurality of client computers 104, 106, 110, 112, 114, 116 are coupled to a network 102. Each of the client computers may comprise a personal computer, workstation, personal digital assistant or mobile PC, or any other suitable data processing device that can perform network communication. In an embodiment, network 102 comprises a local area network (LAN) based on open protocols such as Internet Protocol (IP) and Transport Control Protocol (TCP). Alternatively, network 102 may use other protocols or may comprise a WAN, internetwork, or combination of networks.

A plurality of print devices 120, 122 are coupled to network 102. In various embodiments, print devices 120, 122 comprise printers, multifunction printers, document handling systems, copiers, copier-scanners, or other devices that can generate a printed output. Print devices 120, 122 may comprise ink jet printers, laser printers, flatbed printers, or other printers.

For purposes of illustrating a clear example, FIG. 1 shows six (6) client computers 104, 106, 110, 112, 114, 116 and two (2) print devices 120, 122. In other embodiments, any number of client computers and print devices may be used. Further, other data processing systems may be coupled to network 102, such as routers, switches, servers, and other devices.

In an example embodiment, each of the client computers 104, 106, 110, 112, 114, 116 comprises a memory 130 comprising mail client logic 132 and print manager logic 134. Memory 130 may comprise main memory, system memory, volatile memory, or non-volatile memory of any form such as static RAM, DRAM, FLASH memory, etc. The mail client logic 132 and print manager logic 134 comprise logical elements that implement the functions that are further described herein and may comprise hardware, firmware, software, or any combination thereof.

In an embodiment, mail client logic 132 comprises an e-mail client application program such as Microsoft OUTLOOK, EUDORA, or other e-mail client programs. However, the depiction of mail client logic 132 is merely one example of an application program of client computer 106 that can interact with print manager logic 134 as described herein. Alternatively, an embodiment may comprise an application program such as an e-mail client, word processor, database, spreadsheet or other application program that requests the print manager to provide a particular document to one or more computer users. In another alternative, mail client logic 132 is omitted and the print manager logic 134 interacts with an operating system or other functional elements of the client computer 106.

Print manager logic 134 comprises Web Services client logic 136 and a stored mapping 138 that associates users with preferred print devices. Web Services client logic 136 implements Web Services functions as further described herein, including WS-Device and WSD-PrintService and the component standards thereof as defined by the World Wide Web Consortium (W3C). Information about Web Services functions including version 0.7 of the Web Services standard is available at this writing at the domain w3c.org on the World Wide Web. Mapping 138 may comprise a table, linked list, array, or other data structure that stores information identifying users of the client computers in association with information identifying one or more print devices 120, 122 that an associated user prefers to use for printing.

In an embodiment, each of the print devices 120, 122 comprises a memory 140 that comprises a Web Services server 142, which is coupled to a job history table 144, and one or more other attributes 145. The Web Services server 142 implements Web Services in the print device using the functions further described herein. Further, the Web Services server 142 maintains one or more logs or other stored data containing the history of all jobs that have been sent to the associated print device for a given period of time. The job history table 144 stores information about print jobs that the print device 120, 122 has performed. The one or more other attributes 145 comprise stored information about capabilities and attributes of the print device 120, 122.

Referring now to FIG. 2, in the memory 140 of a print device 122, the job history table 144 may comprise one or more job print tickets 146A, 146B, 146N. For purposes of illustrating a clear example, three (3) job print tickets are shown, but alternate embodiments may comprise any number of job print tickets. Each of the job print tickets 146A, 146B, 146N comprises stored information describing a particular print job that the print device 122 has completed. Each print ticket contains the name of a user who originated a particular print job. An example of a print ticket is shown in TABLE 1.

Table 1—Example Print Ticket

TABLE 1

EXAMPLE PRINT TICKET

```
<wprt:PrintTicket>
    <wprt:JobDescription>
        <wprt:JobName>Example Document</wprt:JobName>
        <wprt:JobOriginatingUserName>John.Smith</wprt:JobOriginatingUserName>
    </wprt:JobDescription>
    <wprt:JobProcessing>
        <wprt:Copies>1</wprt:Copies>
        <wprt:JobFinishings>
            <wprt:Collate>false</wprt:Collate>
            <wprt:JogOffset>false</wprt:JogOffset>
            <wprt:Staple>
                <wprt:Location>StapleTopLeft</wprt:Location>
                <wprt:Angle>Slanted</wprt:Angle>
            </wprt:Staple>
        </wprt:JobFinishings>
        <wprt:Priority>25</wprt:Priority>
    </wprt:JobProcessing>
    <wprt:DocumentProcessing>
        <wprt:MediaSizeName>na_letter_8.5x11in</wprt:MediaSizeName>
        <wprt:NumberUp>
            <wprt:PagesPerSheet>4</wprt:PagesPerSheet>
            <wprt:Direction>RightDown</wprt:Direction>
        </wprt:NumberUp>
        <wprt:Orientation>Portrait</wprt:Orientation>
        <wprt:Resolution>
            <wprt:Width>600</wprt:Width>
        </wprt:Resolution>
        <wprt:PrintQuality>Draft</wprt:PrintQuality>
        <wprt:Sides>TwoSidedLongEdge</wprt:Sides>
    </wprt:DocumentProcessing>
</wprt:PrintTicket>
```

Each of the job print tickets 146A, 146B, 146N is accessible to the Web Services server 142 using functions of an application programming interface (API) defined in Web Services.

2.0 Functional Overview 2.1 Providing Printed Documents to Computer Users

Generally, using the techniques herein, a request is received to provide a printed electronic document to one or more computer users. In an embodiment, a stored table of print devices in a computer network is accessed, and the print devices host a Web Services module. Alternatively, a client computer can send Web Services "probe" messages into the network, and all print devices in the network that are enabled with Web Services will reply with a "ProbeMatch" message. The techniques provide for generating and sending, to each of the print devices, one or more Web Services requests to obtain one or more sets of print history data; determining, from the sets of print history data, a primary print device for each of the one or more computer users; and generating and sending, to each primary print device associated with the one or more computer users, a request to print the electronic document.

Figure 3A:
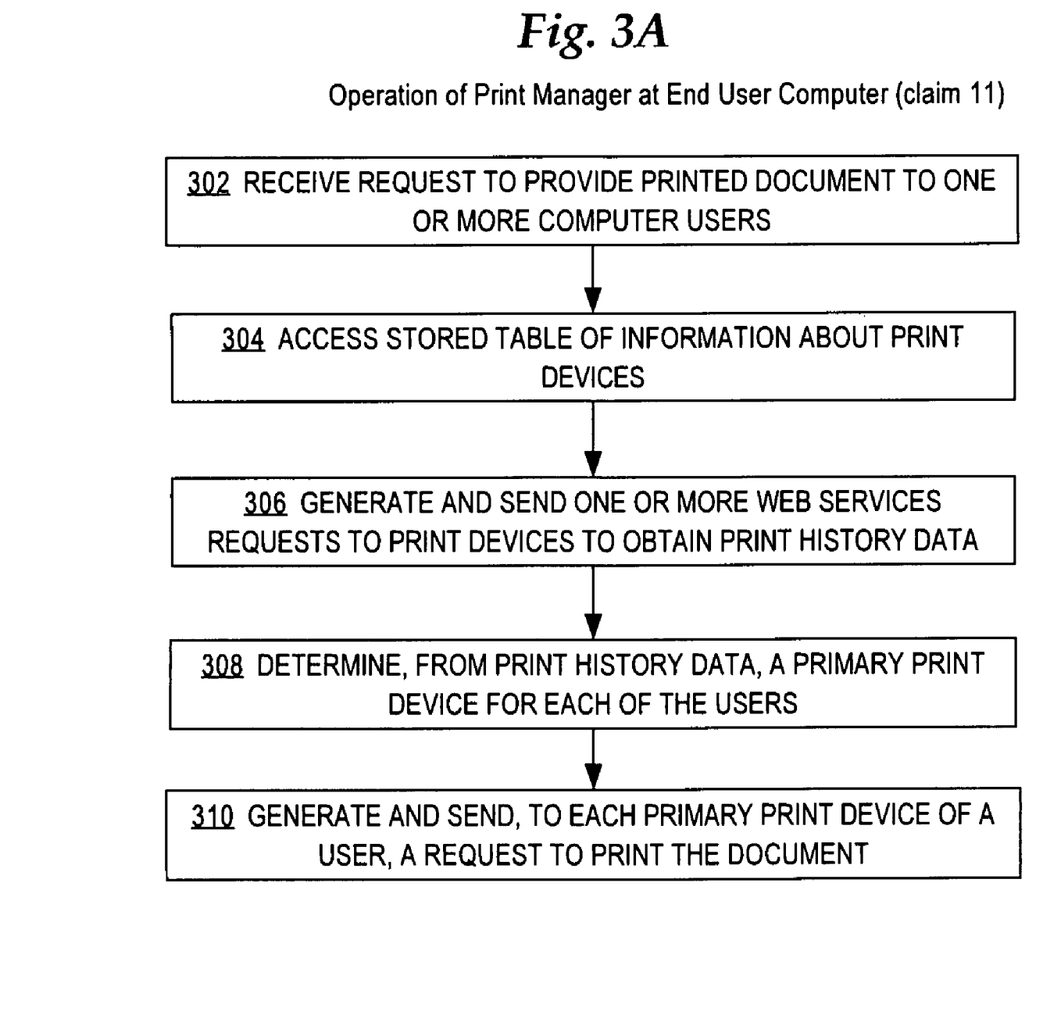
FIG. 3A illustrates an example process of providing an electronic document to a user.
Figure 3B:
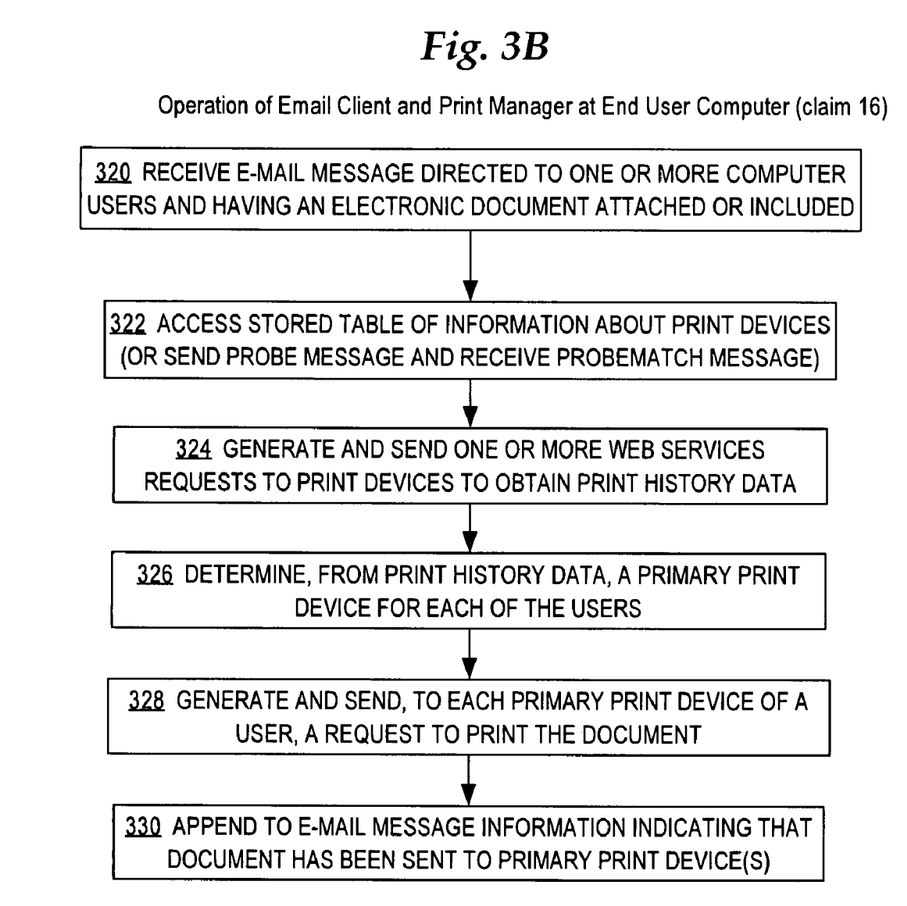
FIG. 3B illustrates another example process of providing an electronic document to a user in which an email client is used.
Figure 4A:
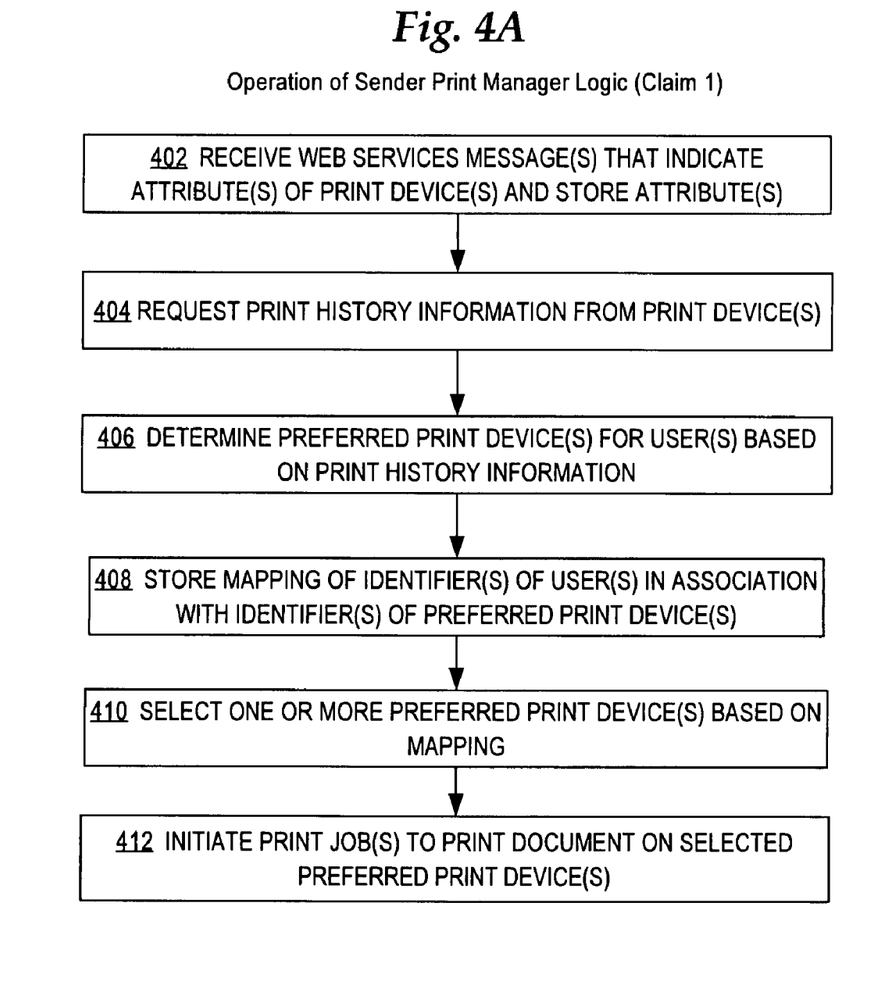
FIG. 4A illustrates another example process of providing an electronic document to a user.
Figure 4B:
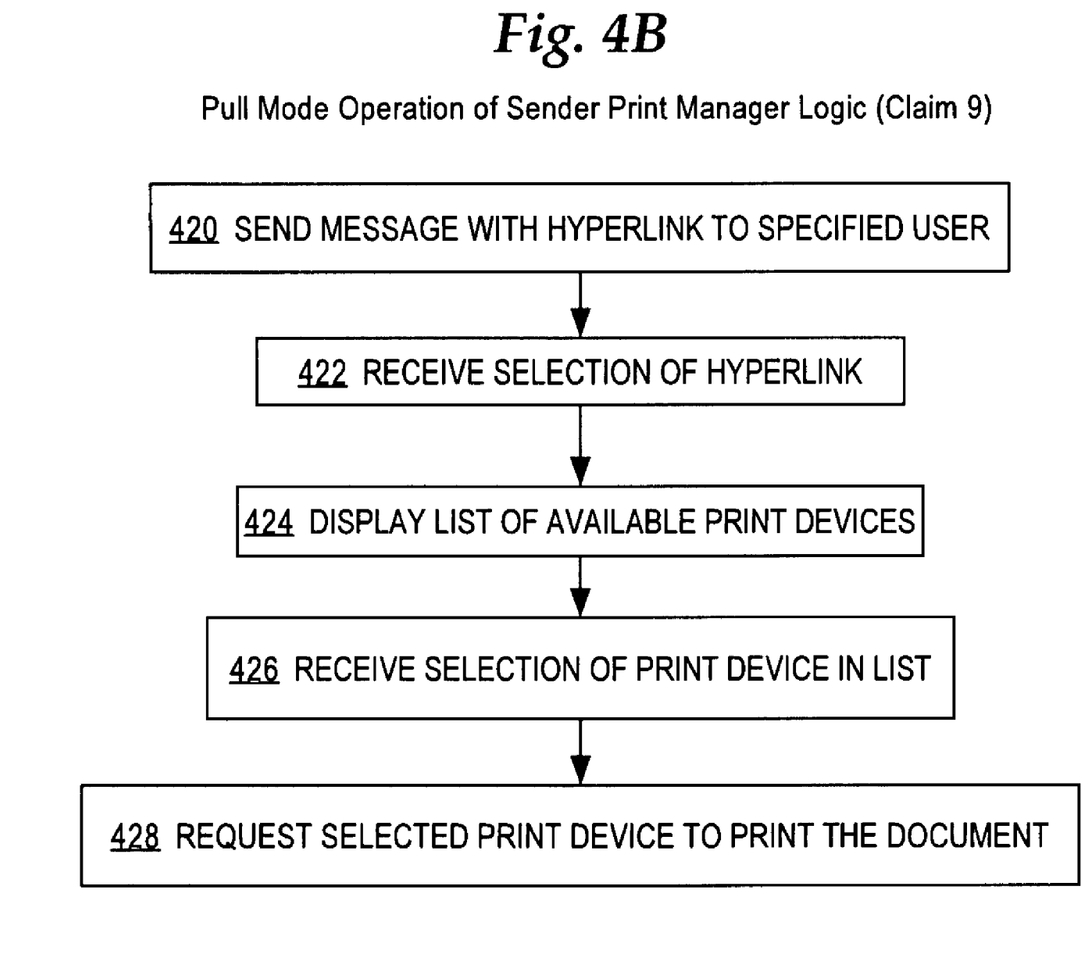
FIG. 4B illustrates additional steps in the process of FIG. 4A that may be used to prompt a user to identify a preferred print device.

FIG. 3A illustrates an example process of providing an electronic document to a user. FIG. 3B illustrates another example process of providing an electronic document to a user in which an email client is used. FIG. 4A illustrates another example process of providing an electronic document to a user. FIG. 4B illustrates additional steps in the process of FIG. 4A that may be used to prompt a user to identify a preferred print device. Referring first to FIG. 3A, in an embodiment, operation of a print manager at a client computer begins at step 302 in which a request is received to provide a printed document to one or more computer users. For example, print manager logic hosted in a client computer receives a message from an application program such as an e-mail client, word processor, database, spreadsheet or other application program that requests the print manager to provide a particular document to one or more computer users.

In any such embodiment, the request may have any suitable form and the particular form used in an embodiment is not critical. The request includes information identifying an electronic document that is to be provided, and information identifying which user(s) should receive a printed copy of the electronic document. For example, the information identifying an electronic document may comprise a path name in a file system that is hosted in the client computer or in the network 102 or in a server of the network. The information identifying an electronic document may comprise a fully-qualified domain name (FQDN) including a file path. Further, the information identifying which user(s) should receive a printed copy of the electronic document may comprise a list of user identifiers, user names, a group name, a role identifier for a role to which one or more users belong, a location in a directory service, or other user identifying information.

In step 304, a stored table of information about print devices is accessed. The stored table indicates what print devices are in the network and that are candidates as a preferred print device for the user(s) identified in the request received at step 302. For example, the stored table may indicate both of the print devices 120, 122 since both are coupled to network 102. Alternatively, the stored table may identify only a subset of all the print devices, such as the print devices that are in a network segment or subnet that includes a client computer that is performing the process of FIG. 3A. Thus, when client computer 106 is performing the process of FIG. 3A, step 304 may involve obtaining information about only print device 120, which is in the same network segment as client computer 106, whereas print device 122 is associated with other client computers in another part of network 102. Alternatively, the client computer can access information about print devices in the network by sending a Web Services "probe" message into the network, and parsing "ProbeMatch" messages, which are received in reply from print devices in the network that are enabled with Web Services.

In step 306, the process generates and sends one or more Web Services requests to the print device(s) 120, 122 that were identified based on accessing the stored table in step 304. The Web Services requests, in effect, ask each such print device(s) to reply with all print history data then currently maintained by the print device(s). In response, a print device 120, 122 sends a reply Web Services message that contains the contents of the job history table 144. TABLE 2 is an example job history response that conforms to version 0.7 of the Web Services specification.

Table 2—Example Job History Response

TABLE 2

EXAMPLE JOB HISTORY RESPONSE

```
<soap:Body>
    <wprt:GetJobHistoryResponse>
        <wprt:JobHistory>
            <wprt:JobSummary>
                <wprt:JobId>1</wprt:JobId>
                <wprt:JobState>Completed</wprt:JobState>
                <wprt:JobStateReasons>
    <wprt:JobStateReason>JobCompletedSuccessfully</wprt:JobStateReason>
            </wprt:JobStateReasons>
            <wprt:JobName>SampleJob 1</wprt:JobName>
            <wprt:JobOriginatingUserName>Joe Smith</wprt:JobOriginatingUserName>
                <wprt:KOctetsProcessed>789</wprt:KOctetsProcessed>
    <wprt:MediaSheetsCompleted>5</wprt:MediaSheetsCompleted>
                <wprt:NumberOfDocuments>2</wprt:NumberOfDocuments>
            </wprt:JobSummary>
            <wprt:JobSummary>
                <wprt:JobId>2</wprt:JobId>
                <wprt:JobState>Aborted</wprt:JobState>
                <wprt:JobStateReasons>
    <wprt:JobStateReason>DocumentFormatError</wprt:JobStateReason>
            </wprt:JobStateReasons>
            <wprt:JobName>Sample Job 2</wprt:JobName>
            <wprt:JobOriginatingUserName>Joe Smith</wprt:JobOriginatingUserName>
                <wprt:KOctetsProcessed>0</wprt:KOctetsProcessed>
<wprt:MediaSheetsCompleted>0</wprt:MediaSheetsCompleted>
                <wprt:NumberOfDocuments>1</wprt:NumberOfDocuments>
            </wprt:JobSummary>
        </wprt:JobHistory>
    </wprt:GetJobHistoryResponse>
</soap:Body>
```

In step 308, the process determines, from the print history data, a primary print device for each of the users. Generally, step 308 comprises parsing or scanning the job history response to identify each user identifier for each particular print ticket, and the print device that was used for that print ticket. However, the data also may be subjected to heuristic analysis to determine a preferred print device by taking into account other information in the print tickets, such as date and time of printing, job state, number of documents printed, size of documents printed, number of sheets printed, etc.

In various embodiments, different executable logic, steps or algorithms may be used to identify a preferred print device for a user based on the print history data. As an example, step 308 may involve determining which print device was most frequently used by a particular user in a particular time period. Alternatively, step 308 involves determining which print device is closest to a particular user in terms of network topology. As another alternative, step 308 involves determining which print device a particular user used for that user's most recent print job.

In another alternative, step 308 involves determining which print device successfully completed the largest number of print jobs for a user. For example, if a user printed eight jobs to Printer 1 but all jobs aborted unsuccessfully, but the same user successfully printed two jobs to Printer 2, then Printer 2 is probably the user's preferred printer even though the user sent more jobs to Printer 1. Under Web Services 0.7, information identifying job state as Success or Abort is included in the job summary within the job history list.

Still another alternative may involve matching a size of the current document to be printed against page count and document size information carried in the print tickets. For example, assume that on Tuesday User A printed two documents each having more than 100 pages to Printer 1, on Monday User A printed 32 documents each having less than 10 pages to Printer 2, and on Wednesday User B wishes to provide User A with a three-page document. Step 308 could determine that Printer 2 is User A's preferred print device because the page count of the current document most closely matches the average page count of Printer 2, even though User A most recently used Printer 1.

Other heuristics and processes may be used. An effect of the approach herein is that one or more preferred print devices for a particular user are inferred from information indicating actual print device usage or print behavior of the user. The user is not required to actively specify which print device is preferred.

In one embodiment, step 308 results in determining one preferred print device for a user. Alternatively, two or more preferred print devices are determined.

In step 310, the process generates and sends a request to print the document to each primary print device of the particular user. Thus, after at least one preferred print device is identified for a user, the process sends the electronic document, as requested at step 302, to the preferred print device for that user.

The steps described herein may be repeated or performed in parallel for all of a plurality of users. An effect of the solution herein is that one user who wishes to distribute an electronic document to multiple users can ensure that each of the users receives a printed copy of the document, even if the users cannot display the document on their client computers because they lack an application that can display the document.

Referring now to FIG. 3B, in an alternative approach, at step 320 an e-mail message is received, directed to one or more computer users and having an electronic document attached or included. For example, mail client logic 132 receives user input to compose a new message that includes a file attachment and user input that requests the mail client logic to provide the attached file to all users who are identified in the message as message recipients. Mail client logic 132 communicates a request to print manager logic 134, requesting the print manager logic to provide the attached file to the recipients. Print manager logic 134 may define an application programming interface or other messaging interface for receiving such requests.

In an embodiment, at step 320 the print manager logic 132 receives an entire e-mail message including, for example, all headers as defined by Simple Mail Transmission Protocol (SMTP) or another mail protocol. Alternatively, print manager logic 132 receives a request identifying one or more users and identifying the attached file, but does not receive an entire message and/or message headers.

Steps 322 to 328, inclusive, are performed according to the same functions and logic as described above for steps 304 to 310, inclusive, of FIG. 3A. As a result, after step 328 of FIG. 3B, the process of FIG. 3B has determined a preferred print device for each recipient that is identified in the e-mail message of step 320.

At step 330, the e-mail message received at step 320 is appended to include information indicating that the attached file has been sent to the primary print devices of the recipients. For example, step 330 comprises appending a new SMTP X-header to the message that identifies the preferred print devices to which the document was sent. Upon receiving and detecting such an X-header, the mail client logic 132 can display a note or an alert message to the user of the client computer 106, or take other action. The note or alert message may comprise a separate e-mail message. The note or alert message can identify the name of the print device that was used to ensure that invitees who use multiple print devices can find the document. Alternatively, step 330 comprises modifying the body of the message to add information such as "** The attached file has been sent to your preferred print device, <printer name>", where <printer name> is the name used in the network or in a directory to denote the preferred print device.

Referring now to FIG. 4A, in one approach, print job history information received in Web Services responses is used to create a stored mapping of preferred print devices in association with user identifiers. In an example process, at step 402, a client computer or print manager logic receives one or more Web Services message(s) that indicate attribute(s) of print device(s), and the client computer or print manager logic stores the attribute(s) for later use.

In an embodiment, when networked print devices 120, 122 power up and come online in the network 102, the print devices sent Web Services messages into the network to announce themselves and their attributes. The print manager logic 132 of each client computer receives the Web Services messages at Web Services client 136, decodes the messages, and stores the attributes in memory for later use. Examples of attributes may include a name, number and type of paper trays, color capabilities, font capabilities, availability of processing engine for ADOBE POSTSCRIPT page description language, and others.

In step 404, print history information is requested from the print devices. For example, print manager logic 132 sends one or more Web Services requests to each of the print devices 120, 122, and the Web Services requests, in effect, as each of the print devices to provide the contents of its job history table 144. In response, the print manager logic 132 receives one or more sets of print history information in Web Services responses.

In step 406, the process determines one or more preferred print device(s) for user(s) in the network based on the received print history information. Any of the techniques described herein in relation to step 308 (FIG. 3A) may be used to implement step 406.

In step 408, a mapping is stored that associates identifier(s) of user(s) to identifier(s) of preferred print devices for those users. The mapping may comprise mapping 138 (FIG. 1) in a client computer, for example. An effect of the approach herein is that a client computer receives and stores information that associates users in the network to preferred print devices of those users. In one embodiment, step 406 results in determining one preferred print device for a user and step 408 stores an identifier of the one preferred print device. Alternatively, two or more preferred print devices are determined and stored in the mapping. The two or more preferred print devices may be stored in the mapping in priority order.

Subsequently, in an embodiment, the stored mapping can be used to automatically select a preferred print device for one or more users and to cause an electronic document to be printed automatically at the preferred print device for those users. For example, in step 410, based on receiving one or more user identifiers, one or more preferred print devices are selected based on the mapping. Step 410 can involve performing a look-up operation in the table, keyed to a user identifier, resulting in retrieving a matching print device identifier from the mapping.

In step 412, one or more print jobs are initiated to print an electronic document on the print devices that were selected at step 412.

The steps described herein may be repeated or performed in parallel for all of a plurality of users. An effect of the solution herein is that the memory of a client computer is modified to structure, store, retain and manage information indicating a preferred print device for a particular user without the user actively indicating which print device is preferred. A further effect is that one user who wishes to distribute an electronic document to multiple users can ensure that each of the users receives a printed copy of the document, even if the users cannot display the document on their client computers because they lack an application that can display the document.

Steps 402 to 408, which are involved in creating the mapping of users to preferred print devices, may be implemented to run independently and collect data periodically. Alternatively, the steps can be triggered to run and collect data by an external program such as a mail client. In the case of a large work environment with many print devices, steps 402 to 408 or the other print manager logic described herein may be implemented as an independent service on a server in network 102 or another network.

An effect of the approaches herein is to automate document distribution without requiring a recipient to install or use an application program that can open or display a document that a sender needs to distribute. Embodiments are effective in spatially large office environments that support LAN connections of print devices.

2.2. Pull Mechanism for Determining Preferred Print Device

In some situations, certain steps of the approaches herein may be unable to determine a preferred print device for a user. For example, the sender of an e-mail message may be unable to identify a recipient's preferred print device, because no print history information is available for that user, because one or more print devices implement Web Services security and do not provide print history information in response to requests, or because print devices do not respond to the sender's Web Services requests. Further, a print device that a recipient generally prefers may not be appropriate at a particular time; for example, a user may receive a meeting invitation on a mobile PC at a time when the user is not in a normal work area that has the preferred print device.

In an embodiment, the recipient is prompted in the e-mail message to identify a preferred printer. Alternatively, the sender may wish to give the recipient the flexibility to print the document when he or she chooses. For example the document might be confidential and the sender may not want to send the document it to a printer if the recipient is unavailable to retrieve the document from the printer.

In these situations, benefits can be obtained in the approaches herein by requesting a user to provide information that identifies a preferred print device. Referring now to FIG. 4B, in an embodiment, in step 420 a message containing a hyperlink is sent to a particular user. For example, print manager logic 132 requests e-mail client logic 134 to create a new e-mail message that is addressed to a particular user. The hyperlink identifies a Web service or network application that implements selecting print devices. In an embodiment, the message and hyperlink do not require the recipient to open or display a document that the sender wishes to provide to the recipient. Thus, an effect of the approach herein is that a recipient is not required to install or use an application that can read or display the document.

In step 422, a selection of the hyperlink is received. For example, the message recipient receives the message, opens the message with an e-mail client program that can process hyperlinks, displays the message with the hyperlink, and selects the hyperlink.

In response, in step 424, a list of available print devices is displayed. Each print device may have a hyperlink or other user interface widget to facilitate selecting the print device.

In step 426, a selection of a print device is received. For example, the recipient selects the hyperlink or other user interface widget associated with a particular print device.

In step 428, the selected print device is requested to print the document.

In an embodiment, FIG. 4B also may be implemented as follows. A Sender composes HTML email message with an HTM-enabled mail client. The Sender selects an "Auto-distribute document" function of the mail client and identifies a document to print for recipients. The Sender addresses the message and sends to recipient. The Sender's Print Manager automatically appends to the message before it is sent: "The sender of this message has identified a document for printing to your local print device. To identify your local print device and print the document, click here."

The Receiver receives the message and clicks on click here. The Receiver's mail client invokes a browser DLL, retrieves and displays an HTML document from an Intranet server on the enterprise LAN. The HTML document contains a list of print devices that are available in the network. The HTML document is dynamically populated with this information from an Active Directory server or other database. Each listed print device has a hyperlink.

The Receiver selects the link for a preferred print device. The network name or IP address of the preferred print device is sent to the Sender's Print Manager. The Sender's Print Manager then communicates with that print device using SOAP to obtain data for that print device and request the print job.

Alternatively, the situations identified above are addressed using the print manager logic of FIG. 1 to automatically obtain the Recipient's preferred printer without involving the recipient person. In an embodiment, the print manager logic 132 on a first client computer 106 of a Sender communicates with print manager logic 132 of a second client computer of the Recipient and exchanges information that specifies the Recipient's preferred printer. In an embodiment, the print manager logic at each client computer communicates with the other using a special-purpose messaging protocol, rather than Web Services. Print manager logic 132 of FIG. 1 may implement a messaging service for the purpose of communicating with other instances of the print manager logic on other client computers.

In any of the embodiments described herein, before initiating a print job on a print device, for example, at steps 310, 328, and 412, the print manager logic 132 may verify that the preferred print device can actually print the requested document. For example, the print manager logic 132 may verify that the preferred print device supports the language, format and other characteristics of the print job. The print manager logic 132 may perform such verification based on the attributes 145 previously received from the print devices and stored by the print manager.

If such verifying indicates that the selected preferred print device cannot print the requested document, then the document may be sent to a default printer, or an implementation can select the next preferred printer for the recipient.

3.0 Hardware Overview

Figure 5:
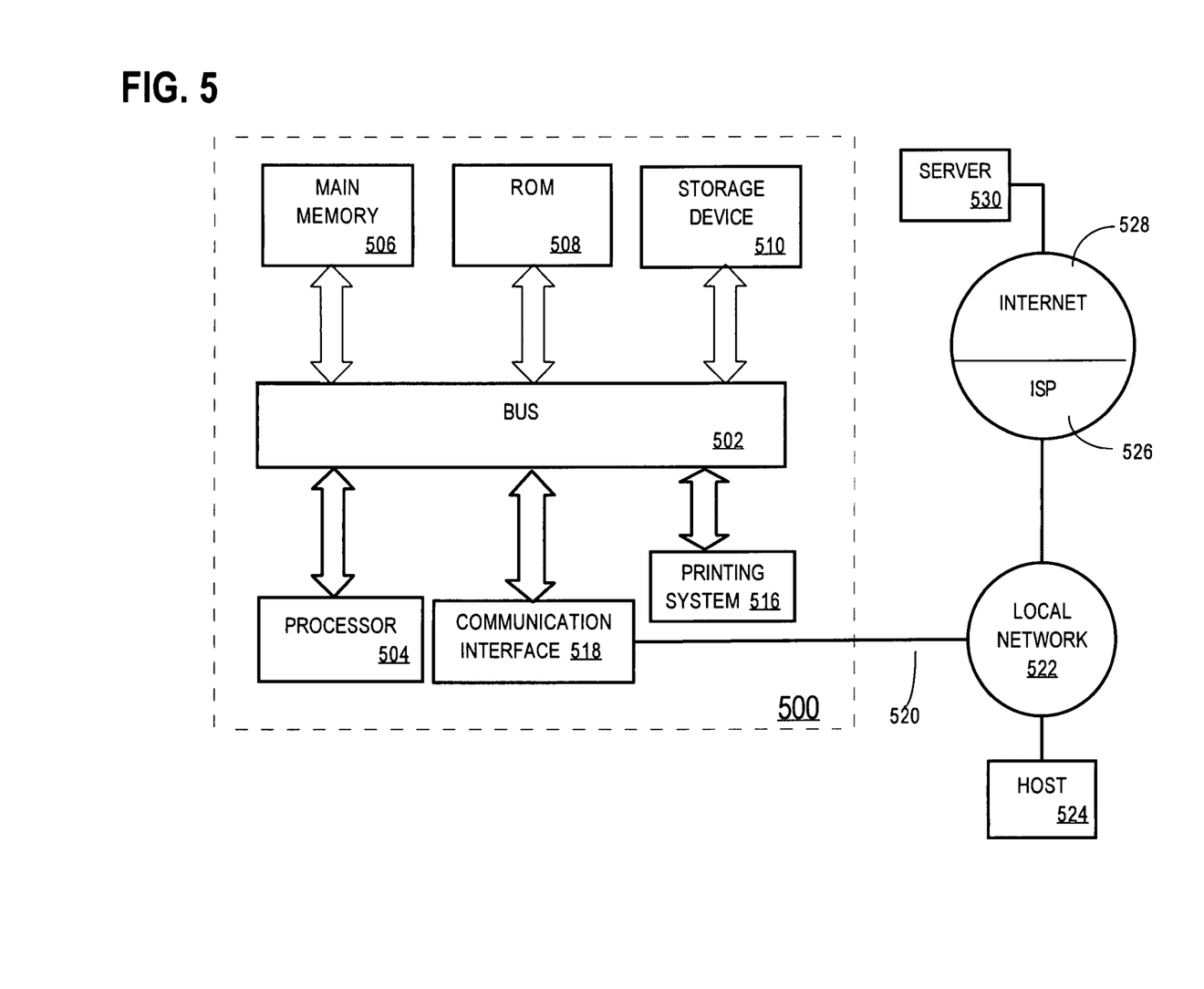
FIG. 5 illustrates an example print device on which an embodiment can be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 may comprise one or more user input devices, such as pushbuttons, keypads, etc., for providing command input to the computer system. Computer system 500 may comprise a display, such as an LED display, LCD display, or individual lamps or LEDs for indicating system state or system functions to a user.

Computer system 500 may comprise a printing system 516 that comprises paper handling apparatus, toner applying apparatus, toner heating apparatus, or ink-jet application apparatus. Using printing system 516, the computer system 500 can transform data received by processor 504 into a printed image on a page, in the manner of a laser printer, inkjet printer, or other form of printer.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for distributing printed documents, comprising:
   print device logic, configured on one or more print devices, comprising a Web Services server, wherein the print device logic is configured to send one or more Web Services messages that indicate attributes of a print device;
   sender print manager logic of a client computer comprising a first Web Services client that is coupled over a network to the print device logic;
   wherein the sender print manager logic is configured to store the attributes of the one or more print devices, to request print history information from the one or more print devices, to determine one or more preferred print devices, from the one or more print devices, that are preferred by one or more recipients based on the print history information, and to store a mapping of identifiers of the recipients in association with identifiers of the one or more preferred print devices; and
   wherein the sender print manager logic is configured to receive information identifying one or more recipients, other than the client computer, of a message having an attached document, to select one or more of the one or more preferred print devices based on the mapping associated with the one or more recipients, and to initiate one or more print jobs to print a document for the one or more recipients on the one or more selected preferred print devices.

2. The system of claim 1, wherein the sender print manager logic is configured to request a job history from a print device, to extract at least one user identifier of a user of the print device from the job history, and to determine a preferred print device for the user based on the job history and the at least one user identifier.

3. The system of claim 1, wherein the sender print manager logic is configured to request a job history from a print device, to extract at least one print ticket from the job history, to extract at least one user identifier of a user of the print device from the job ticket, and to determine a preferred print device for the user based on the job ticket and the at least one user identifier.

4. The system of claim 1, wherein the sender print manager logic is configured to determine the one or more preferred print devices for the one or more users based on the print history by identifying that print device to which a particular user printed most often within a specified time period.

5. The system of claim 1, wherein the sender print manager logic is configured to determine the one or more preferred print devices for the one or more users based on the print history by identifying that print device to which a particular user printed most often within a specified time period and based on how recently that print device was used.

6. The system of claim 1, wherein the sender print manager logic is configured as an independent service.

7. The system of claim 1, further comprising mail client logic that is coupled to the sender print manager logic, wherein the mail client logic is configured to request, for a specified one of the users, a preferred print device based on the mapping, to initiate the one or more print jobs to print a document on the preferred print device, and to send a notification message to the specified one of the users about the one or more print jobs.

8. The system of claim 1, further comprising mail client logic that is coupled to the sender print manager logic, wherein the mail client logic is configured to request, for a specified one of the users, a preferred print device based on the mapping, to initiate the one or more print jobs to print a document on the preferred print device, and to send a message to the specified one of the users identifying the preferred print device.

9. The system of claim 1, further comprising mail client logic that is coupled to the sender print manager logic, wherein the mail client logic is configured to perform upon execution:
   sending a message to the specified one of the users, wherein the message comprises a hyperlink;
   receiving a selection of the hyperlink;
   invoking and displaying an HTML document corresponding to the hyperlink and stored on an Intranet server that is coupled to the network, wherein the HTML document comprises a list of print devices that are available in the network;
   receiving a selection of one print device from among the list;
   initiating a print job to print the document on the selected print device;
   sending a message to the specified one of the users identifying the selected print device.

10. The system of claim 1, further comprising receiver print manager logic comprising a second Web Services client that is coupled over the network to the sender print manager logic, wherein the receiver print manager logic is configured to perform upon execution:
   storing in the mapping, an identifier of the specified one of the users in association with an identifier of the selection of the one print device;
   initiating one or more print jobs to print a document on the selected print device.

* * * * *

UNITED STATES PATENT AND TRADEMARK OFFICE
CERTIFICATE OF CORRECTION

| | | |
|---|---|---|
| PATENT NO. | : 8,144,349 B2 | Page 1 of 1 |
| APPLICATION NO. | : 11/652930 | |
| DATED | : March 27, 2012 | |
| INVENTOR(S) | : Mohammad | |

It is certified that error appears in the above-identified patent and that said Letters Patent is hereby corrected as shown below:

On the Title page, item [73] Assignee: replace "Eicoh Company, Ltd." with --Ricoh Company, Ltd.--

Signed and Sealed this
Eighth Day of May, 2012

David J. Kappos
*Director of the United States Patent and Trademark Office*